US 6,715,681 B2
Apr. 6, 2004

(12) United States Patent
Dvorkis

(10) Patent No.: US 6,715,681 B2
(45) Date of Patent: Apr. 6, 2004

(54) SCANNING MODULE FOR SINGLE LINE AND RASTER SCANNING USING DUAL LASERS

(75) Inventor: Paul Dvorkis, East Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/158,433

(22) Filed: May 30, 2002

(65) Prior Publication Data

US 2002/0139855 A1 Oct. 3, 2002

Related U.S. Application Data

(63) Continuation-in-part of application No. 10/118,378, filed on Apr. 8, 2002, which is a continuation-in-part of application No. 09/223,482, filed on Dec. 30, 1998, now Pat. No. 6,491,222, which is a continuation-in-part of application No. 09/048,418, filed on Mar. 26, 1998, now Pat. No. 6,114,712.

(51) Int. Cl.[7] .................................................. G06K 7/10
(52) U.S. Cl. .............................. 235/462.01; 235/462.1; 235/462.32
(58) Field of Search ....................... 235/462.34, 462.21, 235/462.45, 462.22, 462.07, 454, 462.01, 462.1, 462.32, 462.33, 462.37, 462.36, 462.43, 472.01; 359/211, 219; 73/488, 514.01, 514.16; 116/203; 702/56, 141

(56) References Cited

U.S. PATENT DOCUMENTS

| | | | | |
|---|---|---|---|---|
| 4,121,883 A | * | 10/1978 | Goshima et al. ............ 359/219 |
| 4,808,804 A | * | 2/1989 | Krichever et al. ...... 235/462.22 |
| 5,028,770 A | * | 7/1991 | Miyazaki et al. ....... 235/462.36 |
| 5,181,181 A | * | 1/1993 | Glynn ........................ 702/141 |
| 5,227,910 A | * | 7/1993 | Khattak ....................... 359/211 |
| 5,329,103 A | * | 7/1994 | Rando .................... 235/462.36 |
| 5,460,044 A | * | 10/1995 | Yamamoto ............... 73/514.16 |
| 5,483,051 A | * | 1/1996 | Marchi .................. 235/462.22 |
| 5,504,316 A | * | 4/1996 | Bridgelall et al. ..... 235/462.07 |
| 5,742,042 A | * | 4/1998 | Scofield ................. 235/462.36 |
| 5,808,903 A | * | 9/1998 | Schiltz et al. .................. 702/56 |
| 6,112,990 A | * | 9/2000 | Dickson et al. ........ 235/462.01 |
| 6,227,450 B1 | * | 5/2001 | Blake et al. ........... 235/462.36 |
| 6,527,184 B1 | * | 3/2003 | Oliva .................... 235/462.36 |
| 6,539,798 B1 | * | 4/2003 | Geiger et al. ................. 73/488 |
| 6,540,145 B2 | * | 4/2003 | Gurevich et al. ...... 235/462.21 |
| 6,540,146 B2 | * | 4/2003 | Wu ........................ 235/462.45 |
| 2002/0011520 A1 | * | 1/2002 | Gurevich et al. ...... 235/462.21 |
| 2002/0148900 A1 | * | 10/2002 | Gurevich et al. ...... 235/462.34 |

FOREIGN PATENT DOCUMENTS

WO    WO 98/09174 A1  *  3/1998

* cited by examiner

Primary Examiner—Karl D. Frech
Assistant Examiner—Jared J. Fureman
(74) Attorney, Agent, or Firm—Kirschstein, et al.

(57) ABSTRACT

A retroreflective optical scan module, including first and second selectable light sources having different beam characteristics for directing a selected light beam to a symbol to be read, an optical assembly including a light collecting portion which collects and redirects the light reflected from the symbol along an optical path to a sensor, and a selector for selecting which light source to use depending on whether a one-dimensional or a two-dimensional symbol is being scanned.

8 Claims, 3 Drawing Sheets

SCANNING MODULE FOR SINGLE LINE AND RASTER SCANNING USING DUAL LASERS

REFERENCE TO RELATED APPLICATIONS

The present application is a continuation-in-part of U.S. patent application Ser. No. 10/118,378, filed Apr. 8, 2002, which in turn is a continuation-in-part of U.S. patent application Ser. No. 09/223,482, filed Dec. 30, 1998 now U.S. Pat. No. 6,491,222, which was a continuation-in-part of U.S. patent application Ser. No. 09/048,418, filed Mar. 26, 1998, now U.S. Pat. No. 6,114,712. All of the above-noted applications are hereby incorporated by reference herein.

BACKGROUND OF THE INVENTION

1. Field of the Invention

The field of the invention relates to electro-optical readers or scanning systems, such as bar code symbol readers, and more particularly to the optical path design in a scanning module for use in applications requiring both single line and raster scanning in a single, compact bar code reader.

2. Description of the Related Art

Bar code symbols are formed from bars or elements typically rectangular in shape with a variety of possible widths. The specific arrangement of elements defines the characters represented according to a set of rules and definitions specified by the code or "symbology" used. The relative size of the bars and spaces is determined by the type of coding used as is the actual size of the bars and spaces. The number of characters (represented by the bar code symbol) per unit length is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies is in widespread use including UPC/EAN, Code 39, Code 128, Codabar, and Interleaved 2 of 5.

In order to increase the amount of data that can be represented or stored on a given amount of surface area, several more compact bar code symbologies have been developed. One of these code standards, Code 49, exemplifies a "two-dimensional" symbol by reducing the vertical height of a one-dimensional symbol, and then stacking distinct rows of such one-dimensional symbols, so that information is encoded both vertically as well as horizontally. That is, in Code 49, there are several rows of bar and space patterns, instead of only one row as in a "one-dimensional" symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but of a matrix array made up of hexagonal, square, polygonal and/or other geometric shapes, lines, or dots. Such symbols are described in, for example, U.S. Pat. Nos. 5,2276,315 and 4,794,239. Such matrix code symbologies may include Vericode, Datacode, and MAXICODE.

Various optical scanning systems and readers have been developed heretofore for reading indicia such as bar code symbols appearing on a label or on the surface of an article. The readers function by electro-optically transforming the spatial pattern represented by the graphic indicia into a time-varying electrical signal, which is in turn decoded into data which represent the information or characters encoded in the indicia that are intended to be descriptive of the article or some characteristic thereof. Such data is typically represented in digital form and utilized as an input to a data processing system for applications in point-of-sale processing, inventory control distribution, transportation and logistics, and the like.

One particularly advantageous type of reader is an optical scanner which scans a beam of light, such as a laser beam, across the symbols. Laser scanner systems and components have generally been designed to read indicia having parts of different light reflectivity, i.e., bar code symbols, particularly of the Universal Product Code (UPC) type, at a certain working range or reading distance from a hand-held or stationary scanner to the symbol or target.

In the laser beam scanning systems known in the art, a single laser light beam from a light source is directed by a lens or other optical components along a light path toward a target that includes a bar code symbol on a target surface. The moving-beam scanner operates by repetitively scanning the light beam in a line or a series of lines across the symbol by means of motion of a scanning component, such as the light source itself or a mirror disposed in the path of the light beam. The scanning component may either sweep a beam spot across the symbol and trace a scan line across the symbol, or scan the field of view of a sensor of the scanner, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever et al. describes laser, optical and sensor components mounted on a drive for repetitive reciprocating motion either about an axis or in a plane to effect scanning of the laser beam.

Another type of bar code scanner employs electronic means for causing the light beam to be deflected and thereby scan a bar code symbol, rather than using a mechanical motion to move or deflect the beam. For example, a linear array of closely spaced light sources activated one at a time in a regular sequence may be transmitted to the bar code symbol to simulate a scanned beam from a single source. Instead of a single linear array of light sources, a multiple-line array of individual lasers may also be employed, thereby producing multiple scan lines. Such type of bar code reader is disclosed in U.S. Pat. No. 5,258,605 to Metlitsky et al. The use of multiple discrete lasers is also described in U.S. Pat. No. 5,717,221.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal.

In retroreflective light collection, a single optical component, e.g., a reciprocally oscillatory mirror, such as described by Krichever et al. in U.S. Pat. No. 4,816,661 or by Shepard et al. in U.S. Pat. No. 4,409,470, both herein incorporated by reference, and U.S. Pat. No. 6,114,712, scans the beam across a target surface and directs the collected light to a detector. The mirror surface usually is relatively large to receive as much incoming light as is possible. Only a small detector is required since the mirror can focus the light onto a small detector surface, which increases signal-to-noise ratio.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted. U.S. Pat. No. 6,247,647 describes an arrangement for providing either a multiple line, or a single line, scan pattern by means of a controller. All of the above-mentioned U.S. patents are incorporated herein by reference.

In electro-optical scanners of the type discussed above, the implementation of the laser source, the optics, the mirror structure, the drive to oscillate the mirror structure, the photodetector, and the associated signal processing and decoding circuitry as individual components all add size and weight to the scanner. In applications involving protracted use, a large, heavy scanner can produce user fatigue. When use of the scanner produces fatigue or is in some other way inconvenient, the user is reluctant to operate the scanner. Any reluctance to consistently use the scanner defeats the data gathering purposes for which such bar code systems are intended. Thus, a need exists for a compact module to fit into small compact devices, such as electronic notebooks, portable digital assistants, pagers, cell phones, and other pocket appliances, which can serve multiple scanning applications.

Thus, an ongoing objective of bar code reader development is to miniaturize the reader as much as possible, and a need still exists to further reduce the size and weight of the scan engine and to provide a particularly convenient to use scanner. The mass of the moving components should be as low as possible to minimize the power required to produce the scanning movement, thereby saving battery power.

It is further desirable to modularize the scan engine so that a single module can be used in a variety of different scanning applications, such as a single scan line and a raster scan line pattern. A need exists to develop a particularly compact, lightweight module which contains all the necessary light source, scanner and photosensor components for both applications. A further need exists to permanently visually indicate when a bar code reader has been exposed to mechanical shock.

SUMMARY OF THE INVENTION
Objects of the Invention

It is an object of the present invention to provide a single module capable of selectable single line or rastering scanning motion of the light beam for use in a bar code reader.

A related object is to develop an electro-optical scanning module which is both smaller and lighter in weight than using discrete components, while providing a collector area of at least 20 mm$^2$.

It is yet a further object to produce a module which may be manufactured conveniently, and at low cost.

Another object is to permanently visually indicate when a reader has been exposed to mechanical shock.

Features of the Invention

Briefly, and in general terms, the present invention provides an optical scan module including a base; a light source supported by the base, for generating and directing a light beam along a first segment of a first optical path; a first scan assembly in the first optical path including a reciprocally oscillatable, first scan mirror mounted for receiving the light beam and sweeping the beam in a first direction at a first frequency; an optical assembly including a light collector for collecting and re-directing light reflected from a symbol along a second optical path, the second path having an optical axis that is displaced from said first segment of the first optical path; a second scan assembly in the second optical path including a reciprocally oscillatable, second scan mirror mounted for oscillating movement, and operative for receiving the light beam along the second optical path, and for sweeping the beam in a second direction at a second frequency along a third optical path exteriorly of the module; and a sensor supported by the base for detecting the collected reflected light that has been re-directed by the light collector, and for generating an electrical signal corresponding to the detected light intensity.

The present invention further provides an optical scanner for reading an optical code symbol having either a one-dimensional or a two-dimensional pattern of different light reflectivity, including a first and a second light source for producing first and second laser light beams; and a scanning assembly for receiving one of the light beams and producing a respective outgoing light beam having either a one-dimensional or a two-dimensional scanning pattern.

According to the invention, there is further provided a retroreflective optical scan module, including first and second selectable light sources having different beam characteristics for directing a selected light beam to a symbol to be read, an optical assembly including a light collector which collects and redirects the light reflected from the symbol along an optical path to a sensor, and means for selecting which light source to use depending on whether a one-dimensional or a two-dimensional symbol is being scanned.

According to the invention, there is further provided a small-size optical scan module in the form factor of a substantially rectangular parallelepiped module having dimensions approximately 30 mm×15 mm×7.5 mm. In the first embodiment, on one of the larger sides (i.e., preferably a peripheral side measuring 30 mm×15 mm, there is mounted thereon a light source for emitting a light beam, first and second scanning assemblies for receiving said light beam and for generating therefrom a scanning beam directed to an indicia to be read, a detector, and a collector mirror arranged to receive reflected light and to direct it to the detector.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. Further features of the invention are set out in the appended independent claims, and further preferred features are set out in the dependent claims.

DETAILED DESCRIPTION OF THE PREFERRED EMBODIMENTS

The invention relates to bar code readers of the type generally described in the above identified patents and patent applications for reading bar code symbols. As used in this specification and the claims, the term "bar code symbol" is intended to be broadly construed and to cover not only symbol patterns composed of alternating bars and spaces, but also other graphic patterns, such as dot or matrix array patterns, and, in short, indicia having portions of different light reflectivity or surface characteristics that results in contrasting detected signal characteristics that can be used for encoding information and can be read and decoded with the type of apparatus disclosed herein.

Figure 1:
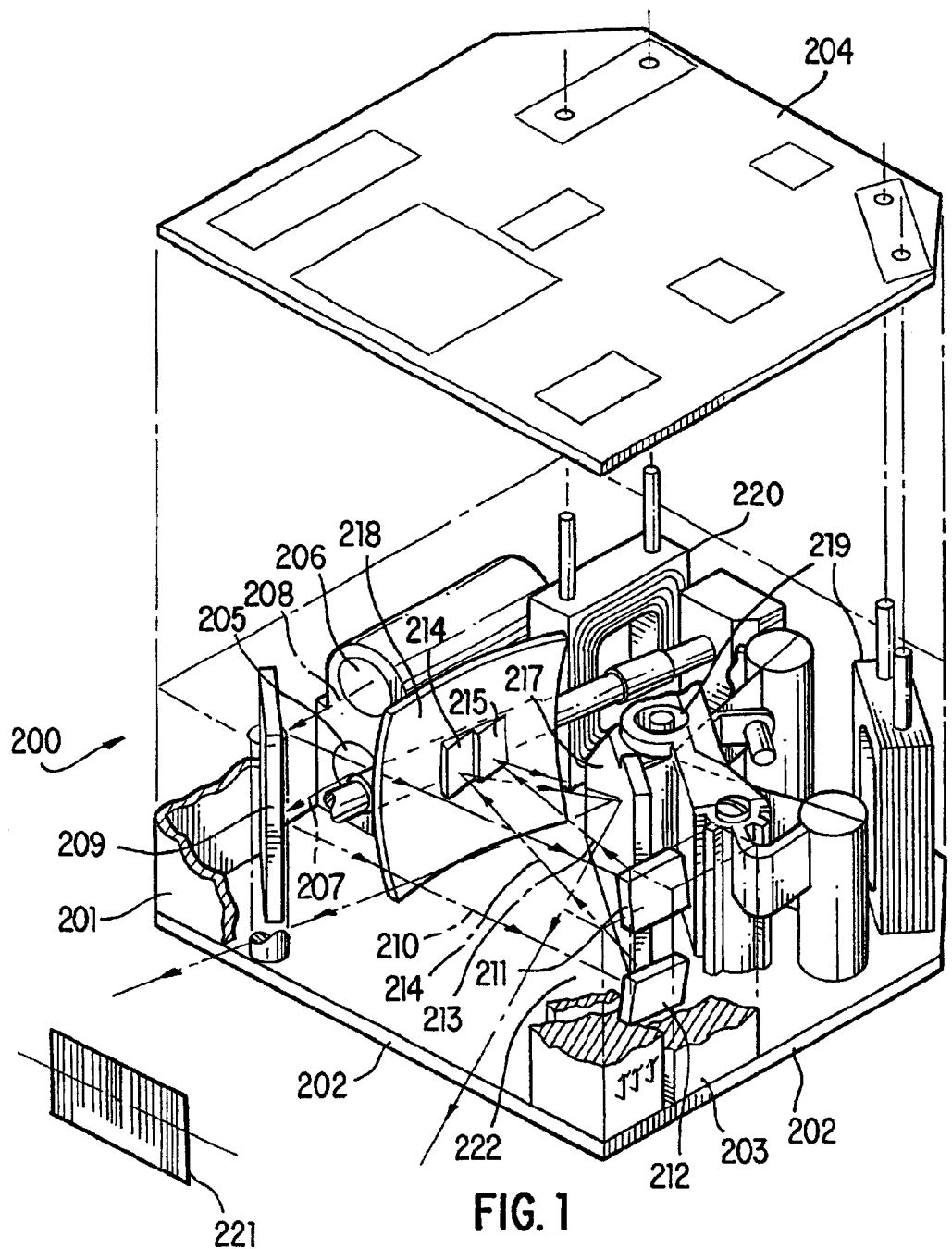
FIG. 1 is a an exploded, perspective view of an optical scanning module according to the preferred embodiment of the invention.
Figure 2:
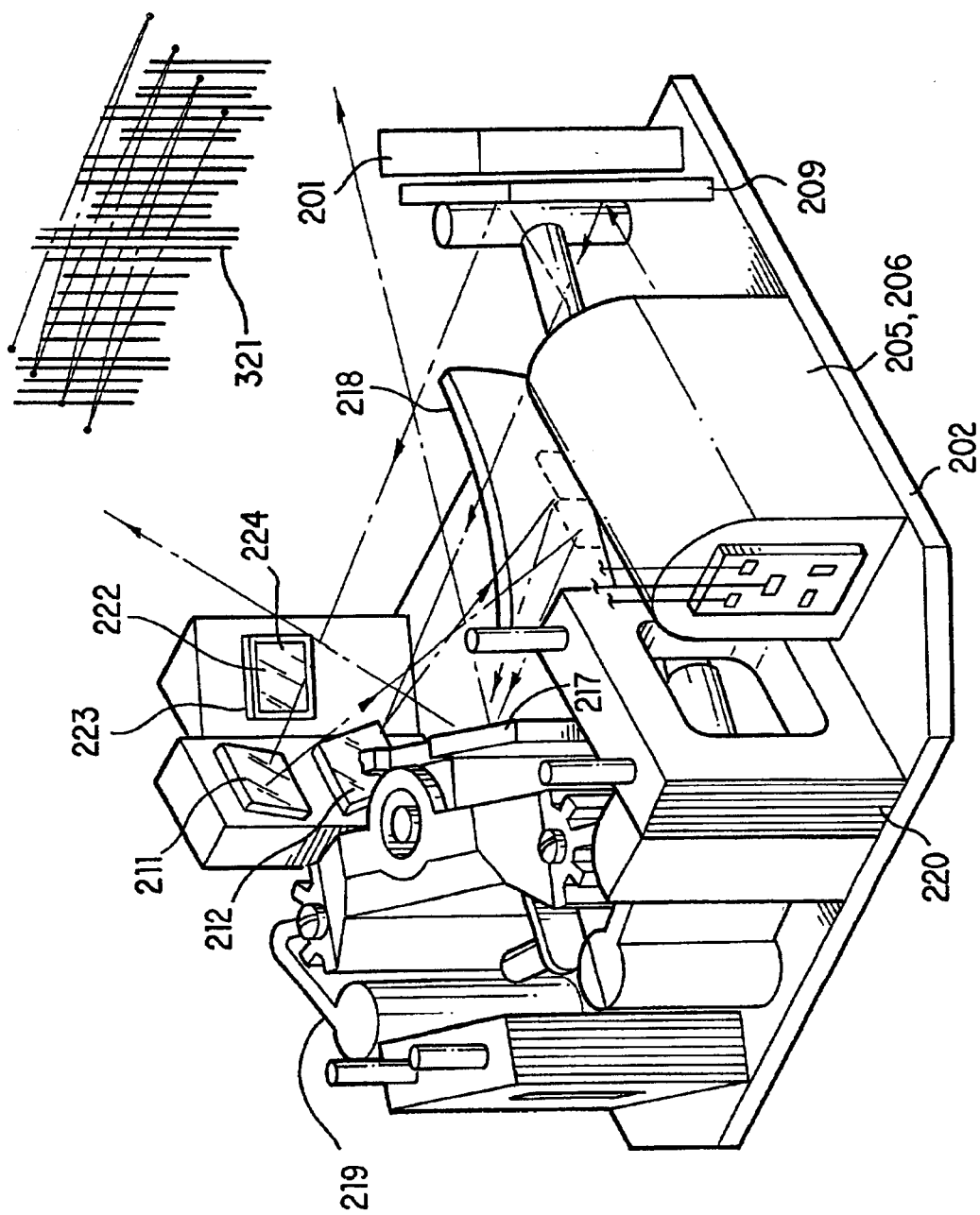
FIG. 2 is a perspective view of the module of FIG. 1 from another viewpoint.

As a preferred embodiment, we describe the implementation of the present invention in a laser scanning, bar code reading module similar to the module illustrated in FIGS. 1 and 2. The modular device of FIG. 1 is generally of the style disclosed in U.S. Pat. No. 5,367,151, issued to Dvorkis et al., assigned to Symbol Technologies, Inc. and hereby incorporated herein by reference, and also similar to the configuration of a bar code reader commercially available as part number SE 1000 or SE 1200 from Symbol Technologies, Inc. of Holtsville, N.Y. Alternatively, or in addition, features of U.S. Pat. Nos. 4,387,297 and 4,760,248 issued to Swartz et al., or U.S. Pat. No. 4,409,470 issued to Shepard et al., all such patents being assigned to Symbol Technologies, Inc., may be employed in constructing the bar code reader module of FIG. 1. These U.S. Pat. Nos. 4,760,248, 4,387, 297 and 4,409,470 are incorporated herein by reference.

The module 200 shown in FIG. 1 is formed from an integral frame or support or assembly 201 which is generally a rectangular parallelepiped in shape, having a bottom side 202, side walls 203, and preferably an open top surface enclosed by a printed circuit board (PCB) 204 on which electrical components may be mounted. A first and a second laser diode 205, 206 are mounted on the assembly 201 for producing light beams 207, 208 respectively. The light beams 207, 208 impinge on a mirror 209 from which they are reflected along path 210. The mirror 209 directs the beams to mirrors 212, 211 respectively, and in turn to planar mirrors 214, 215, and in turn to mirror 217, which directs the beams exteriorly of the module 200 in the direction of the target 221.

Although both beams could be directed to the target 221, it is preferred that only one of the diodes 205, 206 is selected, as described below, so that only the selected beam from the selected diode is directed to the target.

The selected beam forms a spot on the target plane. When the mirror is moved, the spot moves along a line (shown by a line across target 221 in FIG. 1), which scans across a bar code symbol. Light is scattered or reflected from the symbol to the mirror 217.

FIG. 1 also depicts a first drive coil and moving mirror assembly 219 which supports the mirror 217 and moves in response to current changes in the first drive coil. FIG. 1 also depicts a second drive coil and moving mirror assembly 220 which supports the mirror 209 and moves in response to current changes in the second drive coil.

The laser diodes 205, 206 are mounted in one corner of the module 200. The laser diodes may be operated in a continuous "constant power" mode, pulsed, or modulated with different power levels, depending on the specific application. It is also known to provide circuitry to maintain each laser diode at a predetermined output power level using a closed-loop feedback circuit using a monitor photodiode associated with the respective diode.

The optical subassembly associated with each laser diode 205, 206 may include a focusing lens and/or aperture stop of the following lens types, depending on the application: spherically symmetric glass or plastic lenses; aspheric glass or plastic lenses, rotationally symmetric as well as non-rotationally symmetric around the optical axis, such as cylindrical optical elements as well as including gradient index lenses, Fresnel lenses, binary optical lenses, or multi-level binary optical lenses; lens systems where the lens diameter itself acts as a functional aperture stop for the system; or holographic optical elements, including, but not restricted to, Fresnel "zone plate" optics.

In an alternative embodiment, the mirror or optical element 209 may be oscillated in the y-direction so as to cause the selected beam to be deflected into a raster scanning pattern as shown in FIG. 2 across a two-dimensional symbol or target 321.

The subassembly or device of FIG. 1 may be implemented in any type of bar code reader, fixed or portable.

The light reflected from the symbol 221 is received by the mirror 217, reflected to the collection mirror 218, and then directed to a detector 222 (see FIG. 2). The detector may be a linear array or one long photodiode mounted on the support 203. More specifically, reflected light from the indicia is first received by the scanning mirror 217, which directs it onto a concave surface of the collector mirror 218. This focuses the light via an aperture 223 and a filter 224 onto the photodetector 222. The photodetector generates an electrical output signal which is then passed on to suitable electronics on the PCB 204 by an electrical coupling.

The scanning mirror 217 is mounted for oscillation about an axis, this being achieved by virtue of the interaction between a permanent magnet and the driven electromagnetic coil 219. A suitable driving signal is applied to the coil, via the PCB 204 and coil electrical contacts.

Although a light masking aperture may be used in front of the photodetector 222, as shown in FIG. 2, for increasing the depth of focus of the photodetector, the same effect can be achieved without an aperture by appropriately specifying the area of the photodetector 222 itself.

The scanner motor drive assemblies 219 and 220 shown in FIGS. 1 and 2 are exemplary, and may be replaced with any type of mechanism for effecting a scanning motion of the selected laser beam in one or two dimensions. For example, the scanner motor drive could comprise any of the configurations disclosed in U.S. Pat. Nos. 5,581,067 and 5,367,151, both of which are incorporated by reference herein.

In another embodiment, the motor drive used to obtain scanning action is preferably a "taut band element" drive. This type of drive is fully described in, inter alia, U.S. Pat. Nos. 5,614,706 and 5,665,954, both of which are commonly assigned herewith and incorporated herein by reference. In essence, the arrangement includes an optical element such as a lightweight mirror mounted on a thin flexible strip (the "taut band") mounted across an electromagnetic coil. A permanent magnet is attached to the optical element which interacts with a varying magnetic field created when an AC signal is applied to the coil to cause repetitive torsional motion in the flexible strip. As a result, the optical element oscillates, thereby providing scanning motion.

A taut band element drive of known type includes a coil, a flexible strip, a mirror and a permanent magnet. The flexible strip can be held against the coil, for example, by a holding annulus. An AC voltage applied to the coil causes torsional oscillation. It will be apparent that this arrangement can replace the arrangement shown generally in FIG. 1.

In another preferred embodiment, the type of motor drive used to oscillate the scan mirror can be a Mylar (trademark) leaf spring supporting an unbalanced mirror assembly. The mirror assembly is mounted to a Mylar leaf spring which flexes as the permanent magnet is driven by the AC coil imparting an oscillating force.

Yet a further alternative is a "micro-machined" mirror assembly as discussed in U.S. patent application Ser. Nos. 08/506,574 and 08/631,364 according to which the mirror is driven back and forth directly by a suitable electrostatic drive motor, preferably of very small dimension.

The preferred laser is a semiconductor laser which is mounted by conventional through-hole techniques on the PCB. The photodiode is preferably an SMD ("surface mounted device") device as is the AC coil for the Mylar leaf spring motor. This eliminates the need for standoffs and hand-soldering or sockets, as are used on prior art scanners. Typically, the laser will be a standard packaged edge-emitting laser. For minimum cost, the laser focusing is not adjustable, and the laser is simply installed with its mounting flange in contact with a shoulder molded as part of a molded member. This will position the laser accurately enough with respect to a molded focusing lens to provide adequate performance within an inexpensive scanner. The fact that the focusing lens is molded as part of the same component as the shoulder minimizes tolerance build-ups that could otherwise cause improper focusing.

The laser is held in place within the molded member by means of ultraviolet-curing cement. Since the plastics material of the molded member is transparent to ultraviolet light, the cement may be cured by shining ultraviolet light through the member into the cavity within which the laser is positioned. Cement may be applied to the laser, or to the molded member, with the laser then being pushed into the cavity until it abuts the positioning shoulder. The assembly may then be exposed to ultraviolet light for a few seconds, thereby curing the cement. If desired for higher performance, this method of retaining the laser also allows for a focusing adjustment to be made. In this case, the laser is gradually slid into the cavity while the output beam is being monitored. When correct focus is achieved, the assembly is exposed to ultraviolet light, thus curing the cement and locking the assembly into place.

In the unadjusted assembly, it may be possible to eliminate the cement by spring-loading the laser up against the positioning shoulder, for example, by means of a rubber or foam washer between the PCB and the bottom of the laser.

The collector mirror 218 is coated with a reflective coating so that light impinging upon it will be reflected toward the photodetector. This reflective coating may also serve another function. Typically, the coating will be a thin film of metal such as gold, aluminum or chrome. These films are electrically conductive. Accordingly, the film also acts as an electromagnetic interference shield for the photodiode. The use of a surface coating to protect the photodiode enables the usual EMI shield to be dispensed with, thereby eliminating both the cost of a separate shield and the labor to have it installed within the assembly. The coating is preferably electrically grounded.

The optical filter is held in place in front of the photodiode, and also entirely surrounds the photodiode, thereby preventing stray light from reaching it. The aperture may be small to limit the field of view of the detector, thereby maximizing ambient light immunity. The aperture needs to be accurately located with respect to the collector mirror 218, to allow the use of a minimum-sized field of view. Accurate relative positions of the aperture and the collector mirror are easily achieved.

Turning now to the drive assembly for the scanning mirror 217 in more detail, the mirror is mounted in conjunction with a permanent magnet which interacts with a magnetic field provided by one or more AC current-driven coils to oscillate the mirror. The mirror is mounted relative to the base via an attachment element which is connected to the mirror by two Mylar springs. The mirror assembly is of the unbalanced type, that is, no counterweights are provided against the mirror mass as considered relative to the point of support.

The use of an unbalanced mirror, i.e., one in which no counterweights are provided in the mirror assembly, is particularly suitable in implementation in which the mirror is driven at a speed of greater than 100 scans per second. With an unbalanced mirror, since the attachment points of the mirror to the flexible springs is not the center of mass of the mirror assembly, while the mirror is at rest, gravity will exert a relatively greater force on the side of the mirror assembly having the greater mass, causing the mirror to "droop" on its heavier side and pull on the flexible springs. Of course, the effect of such force depends on the orientation of the scanner with respect to the force vector of gravity. The same "drooping" effect is present when the mirror is scanning at relatively low speeds. Hence, in such applications, the use of a balanced mirror would be preferred. A balanced mirror, however, requires additional mass be added to the mirror, or mirror assembly, which is a drawback in terms of operating design weight and the power requirements.

In the embodiment of high speed operation (i.e., at more than 100 scans per second), the material composition, size, shape and thickness of the spring may be appropriately selected to achieve the desired resonant frequency. For example, for operation at approximately 200 scans/second, the selection of a Mylar spring with a thickness of 4 mils is appropriate. For operation at 400 scans/second, a stainless steel spring with a thickness of about 3 mils is preferred.

Figure 3:
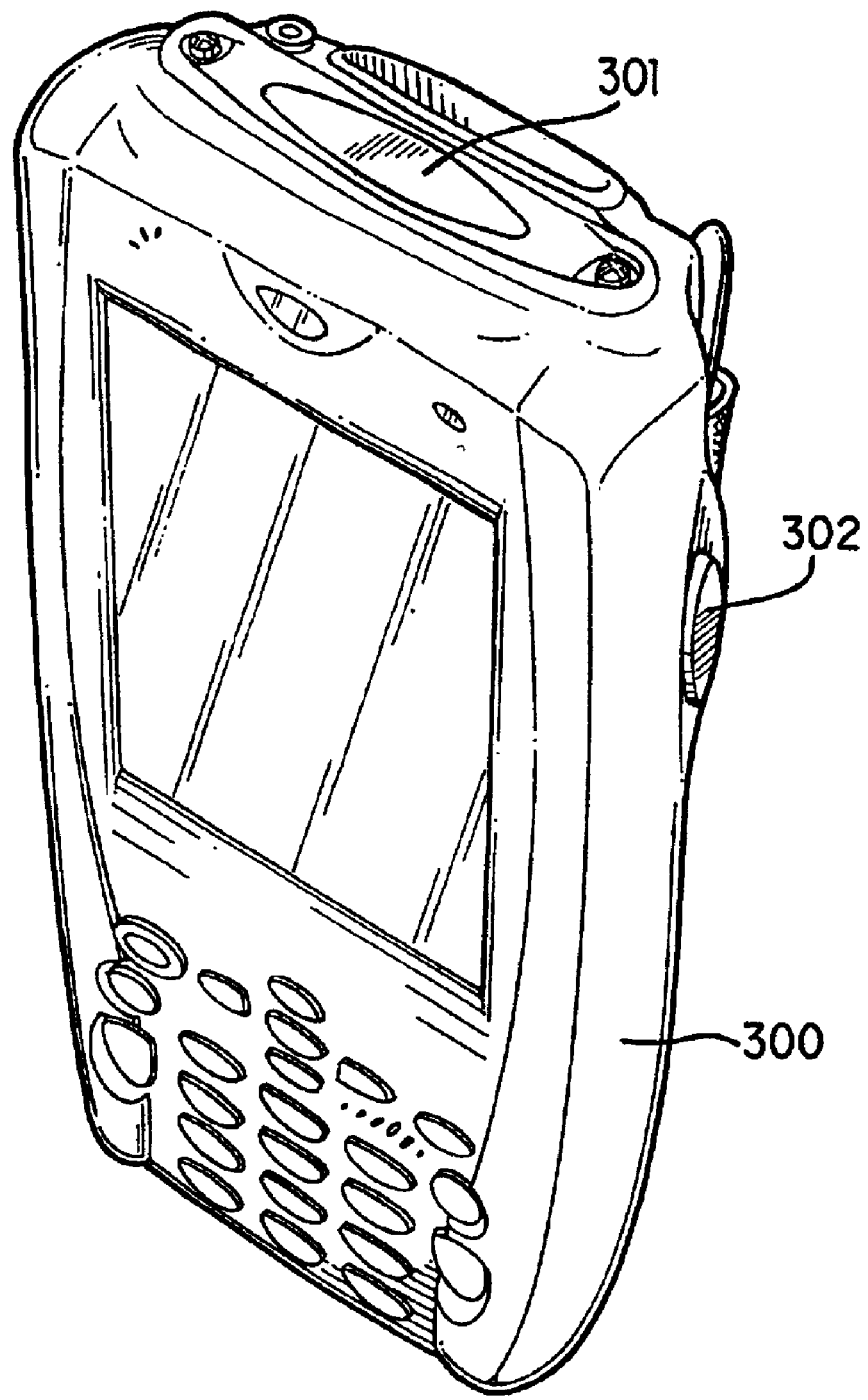
FIG. 3 shows a hand-held terminal in which the optical scanning module may be implemented.

FIG. 3 shows a hand-held terminal 300 in which the optical scanning module of the present invention may be implemented. A window 301 is provided through which the laser beam is emitted. A two-position trigger 302 is operatively connected to the laser diodes 205, 206, preferably to a microprocessor that controls electrical power to the diodes. Upon manually depressing the trigger to a first position, one of the diodes is actuated and is operative, for example, to produce a beam spot having a generally elliptical cross-section. Upon manually depressing the trigger to a second position, the other diode is actuated to produce a beam spot having a different, for example, generally circular cross-section. The elliptical spot is desirable for a single line scan for reading a one-dimensional symbol, especially when the elongation of the spot is parallel to the bars of the symbol. The circular spot is desirable for a raster scan for reading a two-dimensional symbol.

Rather than a two-position switch, a single trigger can be depressed more than once to toggle between beams. Alternatively, two independent triggers can be used, e.g., one on the right side, and one on the left side of the housing.

Alternatively, an automatic sensor can function to detect whether the symbol being read is one-dimensional or two-dimensional and automatically select and activate the appropriate laser diode. The automatic sensor can be rendered in software or hardware.

Various applications have been identified in which it is necessary to track the location of a portable computer as it is moved throughout a predetermined area. One such application relates to order picking in warehouses where the display on a portable computer is used to guide an operator around a warehouse to facilitate finding items to be gathered for shipment to a customer. In these applications the portable computer may be hand-held, it may be a wearable computer, it may be mounted to a cart or it might be mounted to a fork lift. Another application relates to determining the location of a shopping cart that carries a portable computer within a supermarket or other large retail establishment. The display of the portable computer in this application is used to guide the shopper to the shelves that carry items on his shopping list, and/or to present special offers or advertisements to the shopper as he/she moves about the store. In this case the system is much more effective if the offers are related to items situated near where the shopper is located. For example, the display might indicate there is a sale on a particular brand of soft drink when the shopping cart carrying the portable computer is moving down the soft drink aisle.

Various ways of determining the position of a portable computer have been proposed. Some use triangulation based on signals received by radio frequency (R.F.) beacons located within the building. Others use short range beacons that can only be detected when the portable computer is nearby, so if the beacon is detected it is known that the portable computer is positioned close to the beacon. There have also been optical beacons that transmit optical signals within a small area, so that when these signals are detected by a sensor in the portable computer, it is known that the computer is close to the beacon.

The R.F. beacons and the optical beacons both transmit messages identifying themselves, so the portable computer can determine which beacon it is close to. With these systems the computer location can only be located when it is close to a beacon. If it is necessary to know the computer's location anywhere in a large building many beacons may be needed, which may be very expensive. In this situation a triangulation system might be more economical. If it is only necessary to locate when the computer is near a small number of predetermined places within a building, the short range beacon system may be more economical.

These short range beacons, which can be either R.F. or optical, as stated above, must be provided with power. They can use batteries which will need to be changed periodically, but no wiring will be necessary to install them. Alternately, the building can be wired to provide power to the beacons eliminating the need to maintain batteries, but the installation becomes much more expensive.

A position locating system is needed that can locate a computer anywhere in a building without the need for a large number of short range beacons. The system also needs to be less expensive and to use less power than an R.F. triangulation system so that it doesn't reduce the battery life of the portable computer to an unacceptable degree. It is also desirable to minimize the need to build special infrastructure associated with the positioning system into the building to make installation quick, easy and inexpensive.

All of these needs can be met by using small inexpensive accelerometers located inside the portable computer. The outputs from these accelerometers can be used to measure acceleration, changes in direction, etc. so that the computer can keep track of its present location. This is a small inexpensive form of inertial guidance that has been used for military applications. This has become practical for cost sensitive applications today due to the development of low cost accelerometers for automobile air bag actuation.

A system such as this can determine its position with reference to a starting position. It is therefore necessary to occasionally calibrate the system by telling it where it is at that moment. This location then becomes the starting location from which it references its location as it moves about the building until the next time it is calibrated again. When the portable computer is mounted on a shopping cart, it can be calibrated each time the cart is moved through the entrance door of the store, when the shopper is beginning his shopping session. An optical or R.F. beacon can be located on or near the door frame that signals the cart to calibrate itself by setting its current location at the known location of the door. It will also be important to calibrate the system with a known direction of travel at that time, so the cart entrance to the store should require that the cart be moved through a narrow gate after passing through the door, at which time a second calibration signal will be received from the gate. The system will then have two calibration points which will determine a line in a known orientation to the rest of the building. The system now knows its location and its direction of travel as the shopping session begins. These two calibration points can also be used to sense when a cart is being moved out of the store, instead of into the store because the points will be passed in the opposite sequence.

In practice, the portable computer will carry a map of the store in its memory. It will be able to display its position on the map as it moves around the store. It will also be able to display offers related to items on the store shelves as it moves near to those items, or it can show the shopper how to find items he wishes to purchase. The displayed map can also display small symbols on the map indicating where products with associated offers are located in the store, allowing shoppers to easily locate them. In a warehouse picking application the computer can show the operator how to get to the next item to be picked in the shortest possible time. Both systems can give directions in written step by step form, as well as a route displayed on a map. For example, the display can tell the user to go to the end of the aisle and turn left. When he does that, it can tell him to proceed in that direction until told to turn right, etc.

It is possible that inaccuracies in the accelerometers' outputs or rounding off errors in the position calculating electronics can accumulate over time resulting in inaccuracy of position information. This can be improved by intelligent use of the map that is contained in the computer's memory. For example, if the computer thinks that the cart is moving parallel to an aisle, but far enough to one side of the aisle that the cart would have to be partially occupying the same space as the known location of the shelves along the aisle, it can assume that its position determination has become inaccurate and it can reposition its currently determined position toward the center of the aisle by enough to avoid indicating that the cart is out of the aisle. Alternatively, it can simply show the cart moving down the center of the nearest aisle that runs approximately parallel to the cart's present direction of travel. If a cart moving down an aisle is not moving, on the average, parallel to the length of the aisle the directional calibration may be slightly in error. This can also be corrected as the cart moves around the store. The use of strategies of this kind will allow the system to constantly correct for accumulating errors. It is also possible to have one or more additional position calibration points in the store so that when a cart passes one of them its position is automatically recalibrated. In some applications, the user will also have a bar code scanner and will occasionally need to scan items on the shelves nearby. When this happens, it will also give the system an indication of where it is because the location of the item being scanned can be known. The location of scanned items can be stored in the portable computer's memory, or can be stored in a remote computer and accessed over an R.F. network.

This system can benefit from the use an electronic compass within the portable computer. This will allow the computer to orient itself with respect to the map of the store and will eliminate the need to calibrate direction by making the cart pass by two calibration points as described above. The system can now be calibrated to a known position by passing by a single calibration point. Directional information will come from the compass. Electronic compasses are used in autopilots for boats and planes, and are also recently being used in cars to give an indication of the direction in which the car is heading. They are becoming inexpensive, they are accurate and use very little battery power.

A system as described above can work well with two accelerometers located in a horizontal plane. The two accelerometers will be oriented at right angles to each other. When the system is mounted on a cart it will always be properly oriented with respect to the plane of the floor such that only two accelerometers are needed. For some applications the computer may be hand-held, so it will not always be oriented with the same side up as the user travels around a building. In this case, a third accelerometer oriented orthogonally to the first two accelerometers will be needed. This will allow it to track its position in three dimensions allowing it to locate itself no matter what position it is held in.

There are several ways in which the performance of imagers can be improved if accelerometers are included within the scanner housing.

Accelerometers mounted on the imaging optics can be used to eliminate the effects of hand jitter allowing longer integration time and minimizing image smear. This allows stopping down the optical system to improve depth of focus. The accelerometers would measure small motions of the scanner in the vertical and horizontal direction (in the plane of the sensor). The optical assembly would be moved in directions opposite the measured motion by magnetic or piezoelectric actuators holding the optics stationary within the moving housing. The actuators could stabilize the entire camera, including the sensor array and its focusing optics, or only the array could be moved. Similar technology is used today to stabilize binoculars.

Accelerometers could also be used in a scanner with a single line imaging sensor to expand its capabilities. For example, single line imaging scanners are used today to read two-dimensional codes such as PDF 417 by moving the scanner manually up and down, scanning it across the rows of the symbol while the sensor is automatically scanning horizontally across the columns. This technique cannot be used for other two-dimensional symbologies, such as Data Matrix or QR code. If accelerometers were installed in the scanner to measure vertical and horizontal motion of the scanner housing, their outputs could be used to determine where the scanner was pointing during each scan, allowing an image to be built up out of many individual scans. The data from each scan could be placed in its proper location with respect to the other scans in an array in memory until enough of the whole image existed to decode the symbol. This kind of scanner could also be used for image/signature capture. Accelerometers could be used in a similar way to create an image from a single line or rastering laser scanner, eliminating the distortion created by hand movement during image capture.

Another aspect of the present invention is to provide an improved mechanical device for visually indicating when the terminal has been exposed to mechanical shock above a predetermined design limit. See, for example, U.S. Pat. No. 6,186,400 of the Assignee describing the problem and one approach to a solution as depicted in FIG. 7 in such patent.

Portable and handheld units have warranty limits with respect to drop and impact forces. It is difficult to detect or verify whether damage done to the unit is due to shock or impact beyond the values specified in the design specification. The device of the present invention shown in FIG. 4 will indicate clearly whether damage has been done to a unit without leaving loose parts that would affect the operation of the unit.

Another embodiment of the present invention relates to measuring the "percent decode" based on multiple scans of the same symbol. One possible way to measure symbol quality is with percent decode, as is known from bar code verifiers. Such prior art verifiers were placed on a symbol and left there long enough to scan the symbol a multitude of times, for example, a thousand times. The number of decodes that occurred out of the thousand attempts was computed and displayed. Obviously, in a reader, the user cannot wait for a thousand scans to occur because it will make it too sluggish. In addition, unlike a verifier, a hand-held scanner may not be aimed at the symbol when initially triggered, so the first few scans may not be useable for a percent decode calculation. The scanner will have to be able to know when the laser is crossing the entire symbol before scans can begin to be counted in the percent decode calculation. This can be done by waiting until a decode occurs, and than letting the scanner run for a few more scans, to see if the following scans also decode. The scanners according to the present invention will probably be running at three hundred scans per second. If the scanner is run for three more scans after a decode, then we will have four scans across the symbol all together, and it will only take 9.9 ms longer than it took to get a single scan. This short time duration is not perceptible by the scanner operator. We can, however, start the decode beep as soon as the first decode happens, and gather the following three scans during the beep. The number of scans that decode, out of the four attempts can provide a crude percent decode. This is probably good enough resolution for this application.

Although percent decode is only meaningful if the scan line is covering the symbol, some measure of symbol quality can be obtained by counting how long the scanner runs (or how many scans are made) before a decode happens. This time will be increased if the operator does not aim the scanner carefully before the trigger pull, allowing the scanner to run for a while before moving the scan line onto the symbol. Even so, a symbol that consistently takes longer than other symbols to decode probably has a problem. If the scanner transmits the number of scans it made along with the decoded data for each symbol to the host computer, the host can keep records of time to decode from each symbol in the store. Poorer symbols will have longer average times to decode. In addition, the decode time on poorer symbols will probably have a larger standard deviation than good symbols.

There are other things that one can do that should give the operator some indication of symbol quality. For example, if the scanner has a decoder such as described in U.S. Pat. Nos. 5,302,812 or 5,449,893, then it will be possible to determine if the symbol had some large defects that required heavy filtering, or a high digitizer threshold to permit decoding. The decoder can do whatever is necessary to decode the symbol and transmit the decoded data as soon as it can, for the most aggressive decoding. After the decode has occurred, it can go back and examine the data again starting with a low digitizing threshold, and/or a high amplifier bandwidth. If the symbol is decodable under these circumstances, then it is a good quality code. If it does not decode, then a higher threshold or lower bandwidth can be tried until a decode is obtained. A poorer symbol will need a higher threshold or heavier filtering to enable a decode.

Some damaged symbols may be impossible to decode with a single scan and may require stitching together symbol fragments from multiple scans. The number of scans needed to obtain all necessary fragments will be an indication of how bad the symbol is. Symbols that require half block stitching to decode are probably more badly damaged than symbols that can be decoded with block decoding. This can be done by counting how many scans it takes to decode after a first block is detected.

A digitizer with multiple thresholds can also be used to estimate bar code quality. The decoder can attempt to decode with all thresholds, on successive scans. Symbols that decode on all thresholds are good. Symbols that decode with only two out of three thresholds are not good. Symbols that decode on only one are poor. The decoder will run through the available thresholds until a decode occurs. Then it will use the next two scans to try the other thresholds. This way it can be sure that the scan line is on the symbol for all scans that are used to make a quality judgment. This requires that each symbol be scanned three times (or four times, if four thresholds are used), but at three hundred scans per second, two more scans only takes 6.6 ms.

This functionally can also be implemented on a scanner that runs at one hundred scans per second. Gathering two more scans (to attempt decoding with the other two thresholds) after a decode will require an additional 20 ms. The beeper can be activated after the first decode to assure that the scanner does not become sluggish when the quality measuring function is activated. The quality function should be selectable by the user so it can be disabled for customers who do not want to use it.

It will be understood that each of the features described above, or two or more together, may find a useful application in other types of scanners and bar code readers differing from the types described above.

While the invention has been illustrated and described as embodied in a scan module for an electro-optical scanner or bar code reader, it is not intended to be limited to the details shown, since various modifications and structural changes may be made without departing in any way from the spirit and scope of the present invention. In particular it will be recognized that features described in relation to one embodiment can be incorporated into other embodiments as appropriate in a manner that will be apparent to the skilled reader.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for selectively electro-optically reading one-dimensional and two-dimensional symbols, comprising:

a) a support;
   b) a first, selectable light source on the support for producing a first light beam having a generally elliptical cross-section;
   c) a second, selectable light source on the support for producing a second light beam having a generally circular cross-section;
   d) means for detecting whether a symbol being read is one-dimensional or two-dimensional, and for selecting the first light beam when a detected symbol is one-dimensional, and for selecting the second light beam when the detected symbol is two-dimensional;
   e) a scanner on the support for sweeping a selected beam over the detected symbol for reflection therefrom; and
   f) a sensor on the support for sensing light reflected from the detected symbol and for generating an electrical signal corresponding to the detected symbol.

2. The arrangement of claim 1, wherein each light source is a laser.

3. The arrangement of claim 1, wherein the scanner includes a first scan mirror oscillatable about a first axis, and a second scan mirror oscillatable about a second axis perpendicular to the first axis.

4. The arrangement of claim 3, and an electromagnetic drive for oscillating each mirror.

5. The arrangement of claim 1, and a collection mirror on the support for collecting the reflected light, and for directing the collected light to the sensor.

6. The arrangement of claim 1, wherein the support includes a generally rectangular parallelepiped module and a printed circuit board.

7. The arrangement of claim 1, wherein the detecting means includes a switch switchable between a first position corresponding to selection of the first light beam and a second position corresponding to selection of the second light beam.

8. The arrangement of claim 7, wherein the switch is a manually operated trigger on a housing in which the support is received.

* * * * *